United States Patent
Masuichi et al.

(10) Patent No.: US 7,216,534 B2
(45) Date of Patent: May 15, 2007

(54) SUBSTRATE PROCESSING APPARATUS AND THERMAL TYPE FLOWMETER SUITABLE TO THE SAME

(75) Inventors: Mikio Masuichi, Kyoto (JP); Yukihiro Takamura, Kyoto (JP); Sanzo Moriwaki, Kyoto (JP); Hideki Adachi, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 10/844,753

(22) Filed: May 12, 2004

(65) Prior Publication Data

US 2004/0237642 A1  Dec. 2, 2004

(30) Foreign Application Priority Data

May 27, 2003 (JP) ............................. 2003-148584

(51) Int. Cl.
*G01F 1/68* (2006.01)
(52) U.S. Cl. .................................................. 73/202.5
(58) Field of Classification Search ............... 73/202.5, 73/204.23, 204.25, 202.7, 204.27, 150 A; 285/45; 428/690; 313/504; 118/715
See application file for complete search history.

(56) References Cited

U.S. PATENT DOCUMENTS

| | | | | |
|---|---|---|---|---|
| 4,920,795 A | * | 5/1990 | Codazzi et al. | 73/195 |
| 5,454,260 A | * | 10/1995 | Wang | 73/150 A |
| 5,463,899 A | * | 11/1995 | Zemel et al. | 73/195 |
| 5,716,077 A | * | 2/1998 | Friedrich et al. | 285/45 |
| 6,062,077 A | * | 5/2000 | Azima | 73/204.27 |
| 6,247,495 B1 | | 6/2001 | Yamamoto et al. | 137/599.13 |
| 6,660,093 B2 | * | 12/2003 | Hamaguchi et al. | 118/715 |
| 6,805,979 B2 | * | 10/2004 | Ogura et al. | 428/690 |
| 6,924,593 B2 | * | 8/2005 | Seki et al. | 313/504 |

FOREIGN PATENT DOCUMENTS

| | | |
|---|---|---|
| JP | 5-238847 | 9/1993 |
| JP | WO95/18240 | 7/1995 |
| JP | 7-197207 | 8/1995 |
| JP | 11-160120 | 6/1999 |
| JP | 2000-171275 | 6/2000 |
| JP | 2002-75640 | 3/2002 |
| JP | 2002-97092 | 4/2002 |
| JP | 2002-358127 | 12/2002 |

\* cited by examiner

*Primary Examiner*—Jewel Thompson
(74) *Attorney, Agent, or Firm*—Ostrolenk, Faber, Gerb & Soffen, LLP

(57) ABSTRACT

In a thermal type flowmeter 60, a heating/heat-sensitive coil 64 which is shaped as a coil is fit close into an approximately central portion of a duct pipe 63. A flow rate computing circuit 65 supplies electric power to the heating/heat-sensitive coil 64 in accordance with an instruction received from a control portion, the heating/heat-sensitive coil 64 develops heat, and the heat developing at the heating/heat-sensitive coil 64 heats up a hole transporting material 8 which flows through the duct pipe 63. Further, the flow rate computing circuit 65 which is electrically connected with the heating/heat-sensitive coil 64 detects a difference between an upstream-side temperature and a downstream-side temperature, and calculates the flow rate (mass flow rate) of the hole transporting material 8 based on this temperature difference, the amount of heating, physical properties data such as the specific heat and the heat capacity regarding the hole transporting material 8.

19 Claims, 2 Drawing Sheets

F I G. 1
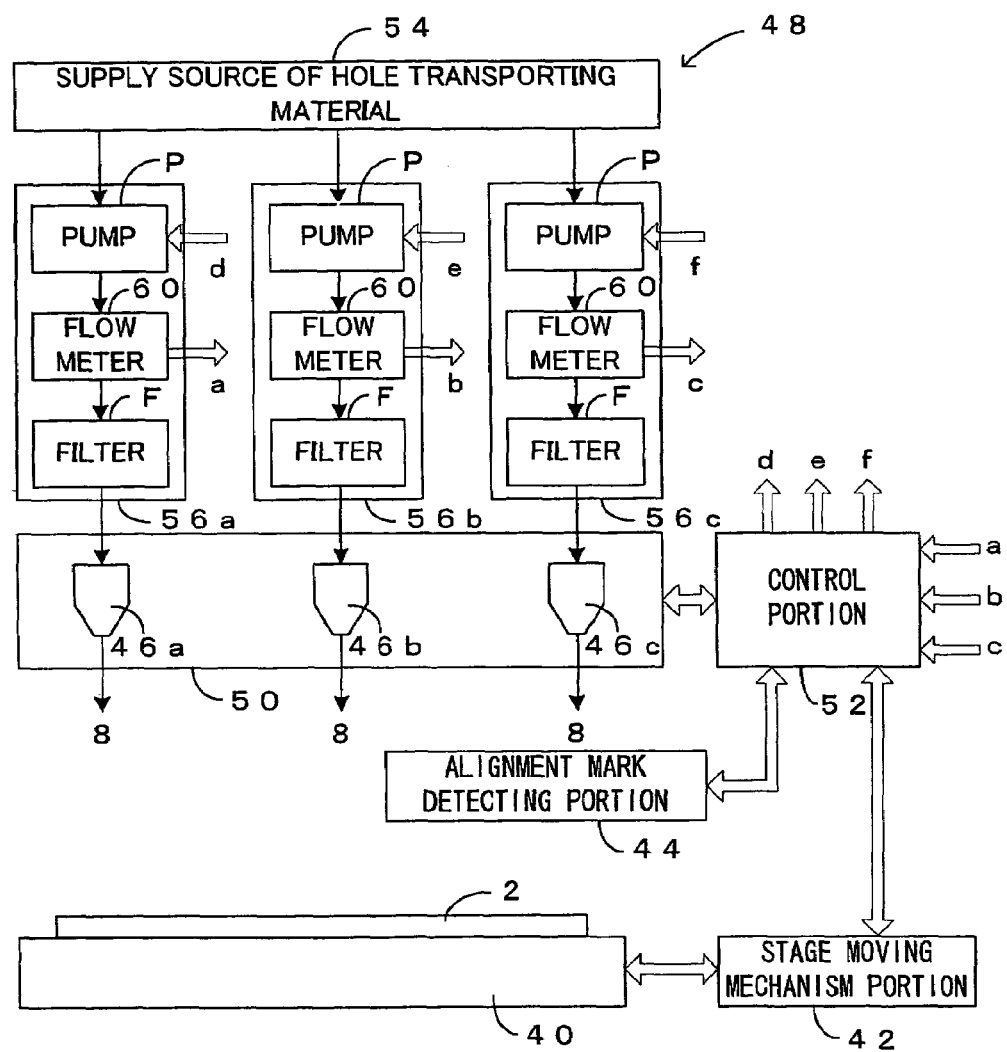

F I G. 2
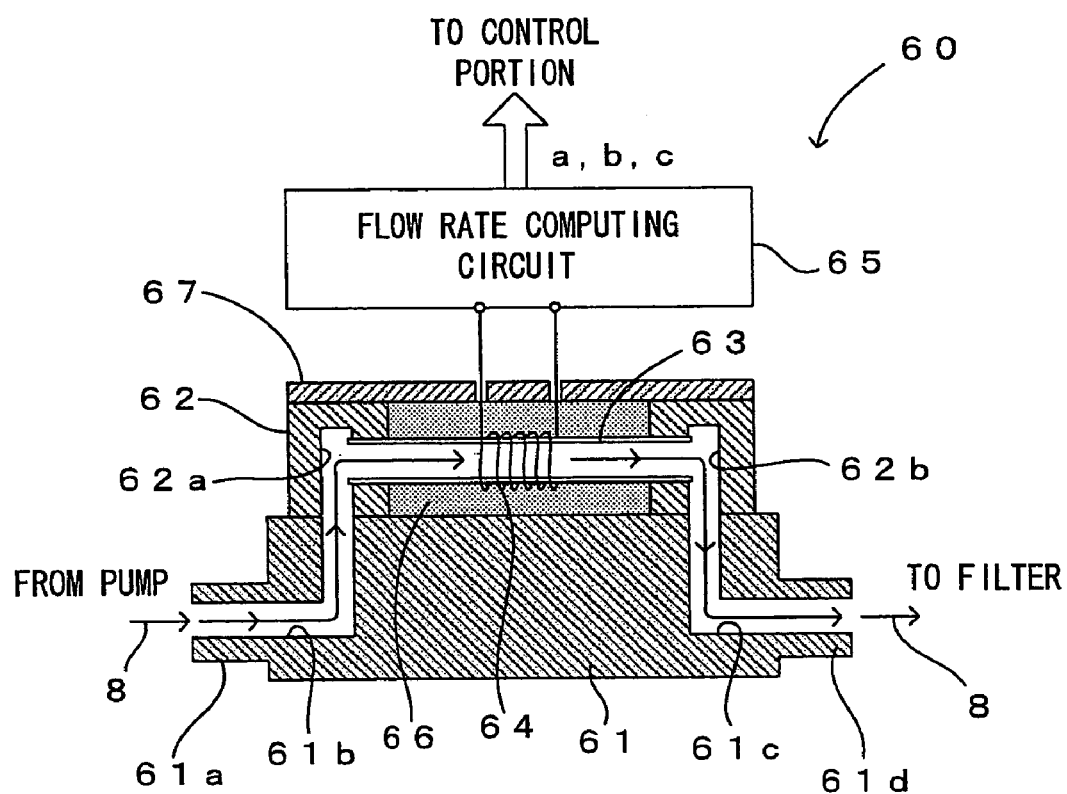

SUBSTRATE PROCESSING APPARATUS AND THERMAL TYPE FLOWMETER SUITABLE TO THE SAME

BACKGROUND OF THE INVENTION

1. Field of the Invention

The present invention relates to a substrate processing apparatus which subjects a substrate to a predetermined treatment by supplying a processing fluid to a nozzle and applying the processing fluid upon the substrate through the nozzle, and to a thermal type flowmeter which is suitable to such an apparatus.

2. Description of the Related Art

This type of substrate processing apparatus is an apparatus which applies, as a processing fluid, an organic EL material upon a glass substrate through a nozzle. In an apparatus described in Japanese Patent Application Laid-Open Gazette No. 2002-75640 for instance, a substrate and a nozzle are moved relative to each other, thereby aligning the nozzle with a groove portion which has been formed in advance in the substrate, an organic EL material is poured into the groove portion through the nozzle, and the organic EL material is thus applied upon the groove portion (application area) of the substrate.

Further, this apparatus comprises a pump as processing fluid feeding means. When the pump works, the processing fluid held in a supply source is supplied to the nozzle and then applied upon a substrate through the nozzle. In addition, for the purpose of monitoring an accurate discharge of the processing fluid applied upon a substrate, a flowmeter is disposed at an outlet of the pump and it is thus possible to measure the flow rate of the processing fluid supplied to the nozzle from the pump. The pump is controlled based on the result of measurement taken by the flowmeter, whereby the flow rate of the processing fluid is adjusted to a proper rate. In this type of substrate processing apparatus, a so-called thermal type flowmeter is used as a flowmeter for the following reason.

In this type of substrate processing apparatus, the width of the groove portion to be applied with the processing fluid is from dozens of microns to about 100 microns for instance, and the depth of the groove is from about 1 to 10 microns for example. Hence, the discharge of the processing fluid at the nozzle is very small and so is the flow rate of the processing fluid which is to be supplied to the nozzle. Because of this, a thermal type flowmeter is used for accurate measurement of a very low flow rate.

However, a conventional thermal type flowmeter has the following structure and therefore causes a problem that it is not possible to perfectly prevent metal ions from getting mixed with the processing fluid. For details, in a thermal type flowmeter, as already known in the art, a heater is disposed to a duct pipe which carries the processing fluid, the processing fluid flowing in the duct pipe is heated up by the heater mentioned earlier, and an upstream-side temperature and a downstream-side temperature of the processing fluid are detected. The flow rate (mass flow rate) of the processing fluid is calculated based on the amount of heating of the processing fluid, a temperature difference between the upstream-side temperature and the downstream-side temperature of the processing fluid, physical properties data regarding the processing fluid, etc. This necessitates forming the duct pipe by a material which exhibits excellent thermal conductivity. A metal pipe of stainless steel or the like has customarily been therefore very often used, considering the corrosion resistance, the acid resistance and the like against the processing fluid. This has sometimes consequently led to a situation that the metallic substance contained in the material of the metal pipe (duct pipe) gets mixed with the processing fluid as ions and applied as such upon a substrate.

Further, there has arose a desire over the recent years to apply a hole transporting material upon a substrate using a substrate processing apparatus having the above-mentioned structure and to form a hole transporting layer on the substrate. However, since a hole transporting material is a processing fluid which has strong acidity of about pH 2 for instance, it is necessary to treat the entire duct, starting at the supply source all the way to the nozzle, against corrosion. To be specific, the inside of the pump may be coated with a corrosion-resistant resin, a nozzle made of resin may be used, or a resin pipe may be used as a pipe. Meanwhile, since a duct pipe of a thermal type flowmeter needs to have thermal conductivity as described above, a resin pipe cannot be used, which is a major obstacle. In other words, if a conventional thermal type flowmeter is used as is, it is not possible to accurately measure the flow rate itself owing to corrosion inside the duct pipe caused by the corrosive processing fluid (hole transporting material), in addition to the problem above that metal ions get mixed with the processing fluid. This makes it impossible to apply the processing fluid in a desired amount upon a substrate, and hence, greatly deteriorates the accuracy of application.

SUMMARY OF THE INVENTION

A major object of the present invention is to provide a substrate processing apparatus which prevents metal ions from getting mixed with a processing fluid and allows to apply a processing fluid which is free of metal ions at an accurate flow rate upon a substrate and to perform a predetermined treatment well, and also to provide a thermal type flowmeter which is suitable to such an apparatus.

The present invention relates to a substrate processing apparatus in which a processing fluid is supplied to a nozzle, the processing fluid is applied upon a substrate through the nozzle and the substrate is accordingly subjected to a predetermined treatment, and to a thermal type flowmeter which is suitable to such an apparatus.

To achieve the object above, the substrate processing apparatus according to the present invention comprises: processing fluid feeding means which feeds the processing fluid toward the nozzle; a thermal type flowmeter which comprises a duct pipe of glass-like carbon, the thermal type flowmeter ensuring that at least a part of said processing fluid fed by the processing fluid feeding means flows through the duct pipe, the thermal type flowmeter measuring the flow rate of the processing fluid flowing through the duct pipe to thereby measure the flow rate of the processing fluid which is supplied to the nozzle; and control means which controls the amount in which the processing fluid is supplied to the nozzle, based on the result of measurement taken by the thermal type flowmeter.

To achieve the object above, a thermal type flowmeter which comprises a duct pipe of glass-like carbon, makes a fluid-to-be-measured flow through the duct pipe, and measures the flow rate of the fluid-to-be-measured which flows through the duct pipe.

With such a structure according to the present invention, since the duct pipe of the thermal type flowmeter are made of glass-like carbon, it is possible to securely prevent metal ions from getting mixed with the processing fluid while the processing fluid flows through the duct pipe. Further, since glass-like carbon is excellent in terms of the resistance against an organic solvent, the corrosion resistance, the acid resistance, etc., the duct pipe are free from corrosion by the processing fluid and it is possible to accurately measure the flow rate of the processing fluid.

BRIEF DESCRIPTION OF THE DRAWINGS

FIG. 1 is a drawing which shows a preferred embodiment of a substrate processing apparatus according to the present invention; and FIG. 2 is a drawing which shows a preferred embodiment of a thermal type flowmeter which is disposed to the substrate processing apparatus which is shown in FIG. 1.

DETAILED DESCRIPTION OF THE PREFERRED EMBODIMENTS

FIG. 1 is a drawing which shows a preferred embodiment of a substrate processing apparatus according to the present invention. In the illustrated example, the substrate processing apparatus according to the present invention is an application apparatus which is suitable to a manufacturing process of an organic EL display apparatus, and a hole transporting material is applied upon a substrate 2 and a hole transporting layer is formed. This application apparatus (substrate processing apparatus) comprises, as shown in FIG. 1, a stage 40 seating the substrate 2 on which an organic EL element is to be formed, a stage moving mechanism portion 42 which moves the stage 40 in a predetermined direction (which is the right-left direction in FIG. 1), an alignment mark detecting portion 44 which detects the position of an alignment mark (not shown) which is provided on the substrate 2, a supply unit 48 which supplies a hole transporting material 8 to three nozzles 46a through 46c, a nozzle moving mechanism portion 50 which moves the three nozzles 46a through 46c in a predetermined direction (which is the direction perpendicular to the plane of FIG. 1), and a control portion 52 which controls the respective portions of the apparatus.

Of these elements, the supply unit 48 comprises a supply source 54 which holds the hole transporting material 8 as shown in FIG. 1, and the supply source 54 is connected by pipes with three supply portions 56a through 56c. Further, the three supply portions 56a through 56c are of the same structure which ensures that the hole transporting material 8 held within the supply source 54 is fed under pressure respectively towards the nozzles 46a through 46c and jetted out toward the substrate 2. To be more specific, the supply portions 56a through 56c are equipped with pumps P which pump out the hole transporting material 8 from the supply source 54 and feed the hole transporting material 8 towards the nozzles, thermal type flowmeters 60 which measure the flow rates of the hole transporting material 8, and filters F which remove foreign matters contained in the hole transporting material 8. In this fashion, the preferred embodiment uses such a structure which makes the hole transporting material 8 jetted out at the respective nozzles 46a through 46c toward the substrate 2, and each one of the nozzles 46a through 46c functions as the "nozzle" used in the present invention. In the meantime, the pumps P function as the "processing fluid feeding means" of the present invention. The structure of the thermal type flowmeters 60 will be described later in detail.

The nozzle moving mechanism portion 50, using holding members (not shown) hold the three nozzles 46a through 46c side by side, and can change the setting of application pitches with the nozzles 46a through 46c. This permits to change application pitches in accordance with how groove portions (not shown) are formed in the substrate 2.

As the alignment mark detecting portion 44, a CCD camera may be used for instance. That is, upon receipt of an instruction from the control portion 52, the alignment mark detecting portion 44 captures the images of alignment marks located at the four corners of the substrate 2 and outputs image data representing thus shot alignment marks to the control portion 52. The control portion 52 calculates the locations of the alignment marks based on the image data obtained by the alignment mark detecting portion 44. Further, since layout data regarding the groove portions and the like on the substrate 2 designed with CAD (Computer Aided Design) has been provided to the control portion 52 in advance, the control portion 52 calculates the start points for application, namely, application start points at-which application of the hole transporting material 8 is to start, based on the result of the calculation of the locations of the alignment marks and the layout data regarding the groove portions which has been provided before.

Besides the computation described above, the control portion 52 controls the stage moving mechanism portion 42 so that the stage 40 will move a predetermined amount in the predetermined direction (which is the right-left direction in FIG. 1), controls the nozzle moving mechanism portion 50 so that the nozzles 46a through 46c will move a predetermined amount in the direction which is orthogonal to the stage 40 (which is the direction perpendicular to the plane of FIG. 1), and accordingly ensures that the nozzles 46a through 46c move in a two dimensional way relative to the substrate 2. As the nozzles 46a through 46c move relative to the substrate 2, in accordance with measurement values a through c received from the thermal type flowmeters 60, the control portion 52 outputs instructions d through f to the respective pumps P such that the hole transporting material 8 will be fed at a predetermined flow rate through the nozzles 46a through 46c.

Next, the structure and operations of the thermal type flowmeters 60 used in the application apparatus according to the preferred embodiment will be described with reference to FIG. 2. FIG. 2 is a drawing which shows a preferred embodiment of the thermal type flowmeters which are disposed to the substrate processing apparatus which is shown in FIG. 1. This thermal type flowmeter 60 comprises a main body 61 which is approximately rectangle, a flange 62 which is stacked on top of the main body 61, and a duct pipe 63 which is held by the flange 62. The preferred embodiment requires that, considering the resistance against an organic solvent, the corrosion resistance, the acid resistance, etc., the main body 61 and the flange 62 are made of a resin material such as trifluoroethylene and that, considering the thermal conductivity in addition to the resistance against an organic solvent and the like mentioned above, the duct pipe 63 is made of glass-like carbon.

An inlet 61a is formed in one surface of the main body 61, whereby the hole transporting material 8 pumped out from the pump P toward the nozzle is guided to the flange 62 via an internal duct 61b which is disposed inside the main body 61. Further, the flange 62 comprises a concave portion 62a which links to the internal duct 61b, to thereby guide the hole transporting material 8 which has come from the main body 61 to one end of the duct pipe 63. In addition, the flange 62 comprises a concave portion 62b which corresponds to the other end of the duct pipe 63, thereby guiding the hole transporting material 8 which has come from the duct pipe 63 to an internal duct 61c of the main body 61. The internal duct 61c is linked with an outlet 61d which is disposed to the other surface of the main body 61, as shown in FIG. 2. Hence, as the pumps P work in accordance with the instructions d through f received from the control portion 52, the hole transporting material 8 flows along each channel which is as follows and is thus fed to the filters F:

inlet 61a—internal duct 61b—concave portion 62a—duct pipe 63—concave portion 62b—internal duct 61c—outlet 61d

Further, in the thermal type flowmeter 60, a heating/heat-sensitive coil 64 which is shaped as a coil is fit close into an approximately central portion of the duct pipe 63. A flow rate computing circuit 65 is electrically connected with the heating/heat-sensitive coil 64. Electric power is supplied to the heating/heat-sensitive coil 64 from the flow rate computing circuit 65 in accordance with an instruction from the control portion 52, the heating/heat-sensitive coil 64 develops heat, and the heat developing at the heating/heat-sensitive coil 64 heats up the hole transporting material 8 which flows through the duct pipe 63. Further, the flow rate computing circuit 65 which is electrically connected with the heating/heat-sensitive coil 64 detects a difference between an upstream-side temperature and a downstream-side temperature, and calculates the flow rate (mass flow rate) of the hole transporting material 8 based on this temperature difference, the amount of heating, physical properties data such as the specific heat and the heat capacity regarding the hole transporting material 8. The thermal type flowmeters 60 supply thus calculated measurement values a through c to the control portion 52.

In FIG. 2, denoted at 66 is an heat insulating material covering an area around the heating/heat-sensitive coil 64, while denoted at 67 is a lid.

In the application apparatus whose structure is as described above, as the substrate 2 as it is before applied with the hole transporting material 8 is put on the stage 40, the control portion 52 provides the respective portions of the apparatus with instructions regarding operations based on detected values and the like received from the respective portions of the apparatus, and the hole transporting material 8 is applied upon the groove portions which are formed in the substrate 2 in the following manner.

First, the alignment mark detecting portion 44 captures the respective images of alignment marks located at the four corners of the substrate 2 which is mounted on the stage 40 in accordance with a mark capture instruction received from the control portion 52, and outputs image data representing thus shot alignment marks to the control portion 52. Receiving the image data, the control portion 52 calculates the locations of the alignment marks based on the image data and further calculates the start points for application. The stage moving mechanism portion 42 and the nozzle moving mechanism portion 50 are activated by a move instruction from the control portion 52, whereby the nozzles 46a through 46c are positioned at the start points. In consequence, each one of the three nozzles 46a through 46c is positioned relative to each one of three groove portions.

At the state ready to start application, the control portion 52 instructs the respective pumps P to start pumping the hole transporting material 8 through the nozzles 46a through 46c into the groove portions which are formed on the substrate 2, while moving the nozzles 46a through 46c in the direction which is perpendicular to the plane of FIG. 1 so that the hole transporting material 8 will be aligned with the groove portions on the substrate 2 and poured into the groove portions. The hole transporting material 8 thus flows into the three groove portions at the same time. Once the nozzles 46a through 46c reach the edges of the groove portions, a stop instruction is fed to each pump P thereby stopping the pouring of the hole transporting material 8 through the nozzles 46a through 46c into the groove portions on the substrate 2, while a stop instruction is fed to the nozzle moving mechanism portion 50 thereby stopping the movement of the nozzles. The control portion 52 controls the amount of application of the hole transporting material 8 in accordance with the speeds at which the nozzles 46a through 46c move such that the amount of application of the hole transporting material 8 will be uniform across points over the stripe-shaped groove portions. Application of the hole transporting material 8 upon the three groove portions completes in this manner. The hole transporting material 8 poured onto a hole transporting layer within the groove portions flows around and levels out because of the viscosity of the hole transporting material 8, and accordingly becomes uniform in terms of thickness. Meanwhile, the thickness of the hole transporting material 8 which has been poured into the groove portions can be adjusted at a high accuracy, by means of control of the flow rates of the hole transporting material 8 pumped out toward the nozzles 46a through 46c based on the measurement values a through c received from the respective thermal type flowmeters 60.

As described above, while the hole transporting material 8 pumped toward the nozzles from the pumps P is controlled using the respective thermal type flowmeters 60 in the preferred embodiment, since the duct pipes 63 in particular of the thermal type flowmeters 60 are made of glass-like carbon, the following effects are promised. First, the duct pipes 63 which are the channels for the hole transporting material 8 to flow through do not contain a metallic material, and even if a metallic material is contained, the amount would be such a very small amount which would not cause any problem. Hence, it is possible to securely prevent metal ions from getting mixed with the hole transporting material 8 while the hole transporting material 8 flows through the duct pipes 63. Of course, the main bodies 61 and the flanges 62 are made of a resin material such as polychlorotrifluoroethylene (PCTFE), in order to prevent metal ions from getting mixed inside the other channels than the duct pipes 63. This makes it possible to measure the flow rates of the hole transporting material 8, free of metal ions such as $Na^+$ (sodium ions) and $SO_4^{2-}$ (sulfate ions).

Further, since the duct pipes 63 are made of glass-like carbon and the thermal conductivity rate of the duct pipes 63 is about 7 (W/mK), it is possible to heat up the hole transporting material 8 and detect the temperature of the hole transporting material 8 using the heating/heat-sensitive coils 64. Through various tests and verifications, the inventor of the present invention confirmed that it was possible to measure the flow rates at a sufficient accuracy. In addition, while corrosion of the duct pipes 63 by the hole transporting material 8 would be a major problem with a conventional apparatus as described earlier under "BACKGROUND OF THE INVENTION" since the hole transporting material 8 is a processing fluid which has strong acidity of about pH 2, the preferred embodiment above solves this problem by forming the duct pipe 63 with glass-like carbon which is excellent in terms of the resistance against an organic solvent, the corrosion resistance, the acid resistance, etc. In other words, the second effect promised by the preferred embodiment is an effect that it is possible to accurately measure the flow rates of the hole transporting material 8. In consequence, as the amount in which the hole transporting material 8 is supplied to the nozzles is controlled based on the measurement results obtained by the thermal type flowmeters 60, application of the hole transporting layer upon the substrate 2 is possible at an excellent accuracy.

The present invention is not limited to the preferred embodiment above, but may be modified in various manners besides the preferred embodiment above to the extent not deviating from the object of the invention. For instance, although the preferred embodiment above demands that all of the hole transporting material 8, which is the material to be measured, is poured into the duct pipes 63 and the flow rates are measured, a thermal type flowmeter of the so-called bypass method may be used instead which measures the flow rates with only a part of the hole transporting material 8 allowed to flow into the duct pipes 63. However, when all of the hole transporting material 8 is allowed into the duct pipes 63 and the flow rates are measured as described above in relation to the preferred embodiment, the following effects (i) and (ii) are obtained, which is more preferable.

(i) The hole transporting material 8 (the processing fluid) can be guided to the duct pipe(s) 63 with rapidity and ease.

(ii) When the bypass method is employed, siphoning phenomenon arises owing to split the hole transporting material 8 and flow a part of the hole transporting material 8 into the duct pipe. Therefore the bypass method is in danger of degrading accuracy of measurement because of a subtle difference in effects of the phenomenon caused by setting and posture and the like of the duct pipe. To the contrary, when all of the hole transporting material 8 is guided to the duct pipe(s) 63, such problems does not occur and accuracy of measurement can be improved. Therefore it is possible to subject the substrate 2 to a predetermined treatment at an excellent accuracy.

Further, although the preferred embodiment is directed to an application of the present invention to a substrate processing apparatus which applies the hole transporting material 8 upon the substrate 2 as a processing fluid, applications of the present invention are not limited to only this. Rather, the present invention is applicable generally to any substrate processing apparatus which supplies a processing fluid upon a substrate and accordingly performs a predetermined treatment. For example, the present invention may be applied to an organic EL application apparatus which supplies an organic EL material upon a substrate and accordingly forms an organic EL layer on the substrate.

Further, although the control portion 52 controls the amount in which the hole transporting material 8 (processing fluid) is supplied to the nozzles by controlling the pumps P based on measurement values received from the thermal type flowmeters 60 according to the preferred embodiment above, the thermal type flowmeters may be replaced with mass flow controllers. As the mass flow controllers, the thermal type flowmeters of the present invention and control valves disposed at the outlets of the thermal type flowmeters may be used together, with the control valves controlled based on measurement results received from the thermal type flowmeters, thereby controlling the amount in which the hole transporting material 8 is supplied to the nozzles.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A substrate processing apparatus in which a processing fluid is supplied to a nozzle, said processing fluid is applied upon a substrate through said nozzle and said substrate is accordingly subjected to a predetermined treatment, comprising:

processing fluid feeding means which feeds said processing fluid toward said nozzle:

a thermal type flowmeter which comprises a duct pipe of glass-like carbon, said thermal type flowmeter ensuring that at least a part of said processing fluid fed by said processing fluid feeding means flows through said duct pipe, said thermal type flowmeter measuring the flow rate of said processing fluid flowing through said duct pipe to thereby measure the flow rate of said processing fluid which is supplied to said nozzle; and control means which controls the amount in which said processing fluid is supplied to said nozzle, based on the result of measurement taken by said thermal type flowmeter, wherein a hole transporting material is applied upon said substrate as said processing fluid and a hole transporting layer is formed on said substrate.

2. The substrate processing apparatus of claim 1, wherein all of said processing fluid fed by said processing fluid feeding means is supplied to said nozzle via said duct pipe.

3. The substrate processing apparatus of claim 1, wherein an organic EL material is applied upon said substrate as said processing fluid and an organic EL layer is formed on said substrate.

4. The substrate processing apparatus of claim 1, wherein said processing fluid is a liquid.

5. The substrate processing apparatus of claim 1, wherein said duct pipe is set between a pipe connected to said processing fluid feeding means and said nozzle.

6. A thermal type flowmeter which comprises a duct pipe of glass-like carbon, makes a fluid-to-be-measured flow through said duct pipe, and measures the flow rate of said fluid-to-be-measured which flows through said duct pipe, in combination with said fluid to be measured, said fluid to be measured being a hole transporting material usable to form a hole transporting layer.

7. The thermal type flowmeter of claim 6, wherein said thermal type flowmeter conducts all of said fluid to be measured through said duct pipe.

8. The thermal type flowmeter of claim 6, in combination with said fluid to be measured, said fluid to be measured being an organic EL material usable to form an organic EL layer.

9. A method of measuring flow of a fluid with a thermal flowmeter. comprising the steps of:

providing said thermal flowmeter with a duct pipe comprising glass-like carbon, conducting said fluid through said duct pipe, and thermally measuring the flow rate of said fluid flowing through said duct pipe, wherein said fluid to be measured is a hole transporting material usable to form a hole transporting layer on a substrate.

10. The method of claim 9, wherein said thermal type flowmeter conducts all of said fluid to be measured through said duct pipe.

11. The method of claim 9, wherein said fluid to be measured is an organic EL material usable to form an organic EL layer on a substrate.

12. The method of claim 9, wherein said fluid to be measured is a hole transporting material, and further comprising the step of using said fluid to form a hole transporting layer on a substrate.

13. The method of claim 9, wherein said fluid to be measured is an organic EL material, and further comprising the step of using said fluid to form an organic EL layer on a substrate.

14. A substrate processing apparatus in which a processing fluid is supplied to a plurality of nozzles, said processing fluid is applied upon a substrate through said nozzles and said substrate is accordingly subjected to a predetermined treatment, comprising:

processing fluid feeding means which feeds said processing fluid toward said nozzles;

a plurality of thermal type flowmeters each of which comprises a duct pipe of glass-like carbon, said thermal type flowmeter ensuring that at least a part of said processing fluid fed by said processing fluid feeding means flows through said duct pipe, said thermal type flowmeter measuring the flow rate of said processing fluid flowing through said duct pipe to thereby measure the flow rate of said processing fluid which is supplied to said nozzles; and control means which controls the amount in which said processing fluid is supplied to said nozzles, based on the result of measurement taken by said thermal type flowmeter, wherein one said thermal type flowmeter is individually arranged in correspondence with each of said plurality nozzles.

15. The substrate processing apparatus of claim 14, wherein all of said processing fluid fed by said processing fluid feeding means is supplied to said nozzles via said duct pipes.

16. The substrate processing apparatus of claim 14, wherein a hole transporting material is applied upon said substrate as said processing fluid and a hole transporting layer is formed on said substrate.

17. The substrate processing apparatus of claim 14, wherein an organic EL material is applied upon said substrate as said processing fluid and an organic EL layer is formed on said substrate.

18. The substrate processing apparatus of claim 14, wherein said processing fluid is a liquid.

19. The substrate processing apparatus of claim 14, wherein each said duct pipe is set between a pipe connected to said processing fluid feeding means and the corresponding said nozzle.

* * * * *